(12) United States Patent
Kawaguchi et al.

(10) Patent No.: US 12,420,639 B2
(45) Date of Patent: Sep. 23, 2025

(54) DISPLAY DEVICE AND CONSTRUCTION MACHINE

(71) Applicant: Yanmar Holdings Co., Ltd., Osaka (JP)

(72) Inventors: Daisuke Kawaguchi, Fukuoka (JP); Naoto Kageyama, Fukuoka (JP); Kazuki Tamura, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 18/228,631

(22) Filed: Jul. 31, 2023

(65) Prior Publication Data

US 2024/0157795 A1    May 16, 2024

(30) Foreign Application Priority Data

Aug. 2, 2022    (JP) .................. 2022-123356

(51) Int. Cl.
*G06F 3/02*    (2006.01)
*B60K 35/22*    (2024.01)
*B60K 35/28*    (2024.01)
*G06F 3/14*    (2006.01)

(52) U.S. Cl.
CPC .............. *B60K 35/28* (2024.01); *B60K 35/22* (2024.01); *G06F 3/02* (2013.01); *G06F 3/14* (2013.01); *B60K 2360/126* (2024.01); *B60K 2360/128* (2024.01); *B60K 2360/167* (2024.01)

(58) Field of Classification Search
CPC .. B60K 35/28; B60K 35/22; B60K 2360/126; B60K 2360/128; B60K 2360/167; G06F 3/02; G06F 3/14
See application file for complete search history.

(56) References Cited

U.S. PATENT DOCUMENTS

| | | | |
|---|---|---|---|
| 9,702,121 B2 * | 7/2017 | Tanaka ................. | G07C 5/0808 |
| 10,391,940 B2 * | 8/2019 | Izumikawa ............... | E02F 9/26 |
| 11,518,318 B2 * | 12/2022 | Sakuta .................... | E02F 9/261 |
| 11,913,197 B2 * | 2/2024 | Fukuoka .................. | E02F 9/26 |
| 2002/0015062 A1 * | 2/2002 | Shimazu ............... | B60K 35/60 |
| | | | 715/772 |
| 2002/0085043 A1 * | 7/2002 | Ribak ................... | B60W 50/14 |
| | | | 715/810 |
| 2009/0315867 A1 * | 12/2009 | Sakamoto ............. | G06F 3/0488 |
| | | | 345/184 |
| 2014/0257645 A1 * | 9/2014 | Date .................... | G07C 5/0825 |
| | | | 701/50 |
| 2016/0265196 A1 * | 9/2016 | Shimizu ............... | G08B 29/185 |
| 2018/0202130 A1 * | 7/2018 | Morimoto ............... | E02F 9/265 |
| 2019/0218753 A1 * | 7/2019 | Morimoto ................ | E02F 3/34 |
| 2021/0223885 A1 * | 7/2021 | Imai ........................ | G06F 3/044 |
| 2023/0062004 A1 * | 3/2023 | Okamoto ............... | B60K 35/10 |

* cited by examiner

*Primary Examiner* — Jeff Piziali

(74) *Attorney, Agent, or Firm* — Chris Mizumoto

(57) ABSTRACT

A display device of a construction machine includes a control unit and a display unit. The display unit displays a display screen having the second display area which is a guidance display area for providing guidance on the operation contents with respect to the display device. The control unit functions as a display control unit that controls the display unit to change a display mode of the second display area according to the operation state of a cutoff lever which is a safety operation member of the construction machine.

12 Claims, 10 Drawing Sheets

DISPLAY DEVICE AND CONSTRUCTION MACHINE

CROSS-REFERENCE

This application claims foreign priority of JP2022-123356 filed Aug. 2, 2022, the disclosure of which is hereby incorporated by reference in its entirety

TECHNICAL FIELD

The present invention relates to a display device mounted on a construction machine, and a construction machine including the display device.

BACKGROUND ART

A construction machine includes a display device capable of displaying various types of information on a display screen of a display unit, and the display device receives various operations performed using an operation element of the display device or an operation device provided separately from the display device. The display device may display the operation content of an operation on the display screen.

For example, Patent Document 1 discloses a small construction machine in which when a gate lock lever is lowered, a gate lock switch is turned on to allow pressure oil to be supplied to a hydraulic cylinder and the like. The small construction machine includes a control device that disables the operation of a monitor switch of a monitor to cause the monitor to stop a partial specific display on a normal screen while an engine is driven and the gate lock lever is lowered.

PRIOR ART DOCUMENT

Patent Document

Patent Document 1: Japanese Patent No. 6577436

SUMMARY OF INVENTION

Technical Problem

A display device to be mounted on a construction machine has a limited space for operation elements due to the structure and size of the display device, and this may interfere with the allocation of a sufficient number of required operation elements to operations for various functions. Furthermore, in a construction machine that includes a safety operation member such as a cutoff lever and that stops the action of a work machine according to the operation of the safety operation member, a display device may require or allow different operations depending on whether the action of the work machine is allowed or stopped according to the operation of the safety operation member. However, a conventional display device includes a limited number of operation elements, thus making it difficult to allocate the operation elements to all the various functions corresponding to the operations of a safety operation member. Furthermore, in a conventional display device, it is difficult for an operator to determine the required or possible operation when a safety operation member is operated, thus leading to lower operability.

An object of the present invention is to provide a display device having higher operability irrespective of the operation of a safety operation member, and a construction machine including the display device.

Solution to Problem

In order to solve the above problem, a display device of the present invention is a display device mounted on a construction machine, the display device including: a display unit that displays a display screen having a guidance display area for providing guidance on an operation content with respect to the display device; and a display control unit that controls the display unit to change a display mode of the guidance display area according to an operation state of a safety operation member of the construction machine.

In order to solve the above problem, a construction machine of the present invention includes the display device.

Advantageous Effects of Invention

The present invention provides a display device having higher operability irrespective of the operation of a safety operation member, and a construction machine including the display device.

DESCRIPTION OF EMBODIMENTS

Figure 1:
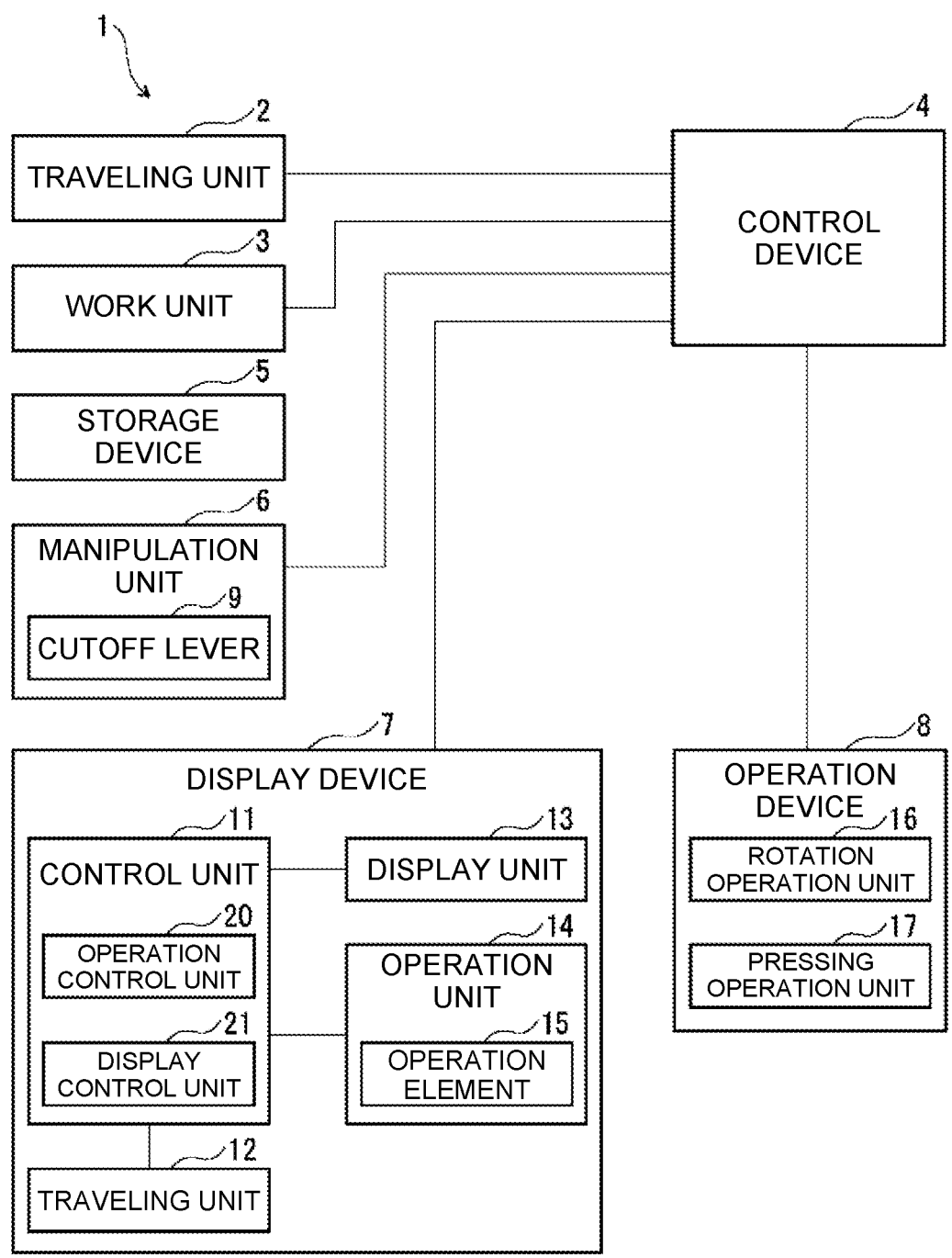
FIG. 1 is a block diagram of a construction machine according to an embodiment of the present invention.

A construction machine 1 according to an embodiment of the present invention will be described with reference to the drawings. FIG. 1 is a block diagram showing the construction machine 1 of the present embodiment.

The construction machine 1 is, for example, a hydraulic excavator that performs work such as civil engineering work and construction work according to an operation performed by an operator. The construction machine 1 includes, for example, a traveling unit 2, a work unit 3, a control device 4, a storage device 5, a manipulation unit 6, a display device 7, and an operation device 8.

The traveling unit 2 performs traveling and turning of the construction machine 1 according to an operation performed by an operator. The traveling unit 2 is composed of a lower traveling body including a pair of crawlers capable of traveling, and an upper turning body including a cabin and an engine. The upper turning body is rotatably supported above the lower traveling body. The traveling unit 2 receives power from the engine and is driven to perform traveling and turning.

The work unit 3 performs various types of work such as earth excavation work and crushing work according to an operation performed by an operator, and is attached to the upper turning body of the traveling unit 2. The work unit 3 is composed of a boom, an arm, and an attachment such as a bucket. The work unit 3 includes a hydraulic actuator, and uses hydraulic power of hydraulic oil to drive the boom, the arm, and the attachment. The work unit 3 uses power generated by the engine of the traveling unit 2 to supply hydraulic oil from a hydraulic tank to the hydraulic actuator by a hydraulic pump, and uses the hydraulic oil pressurized by the hydraulic pump as a power transmission medium to drive the hydraulic actuator.

The control device 4 is composed of a CPU and the like, and controls the action of the components such as the traveling unit 2 and the work unit 3 of the construction machine 1. For example, the control device 4 receives an operation signal output from the manipulation unit 6 and the display device 7, and controls the components according to the operation signal. The storage device 5 is composed of a storage medium such as a ROM or a RAM, and stores a program and data for controlling the construction machine 1. The control device 4 performs arithmetic processing based on the program and data stored in the storage device 5 to control the components and functions of the construction machine 1.

The manipulation unit 6 and the display device 7 are provided in the cabin of the upper turning body. The manipulation unit 6 receives a manipulation performed by an operator. The manipulation unit 6 includes a manipulation lever, a manipulation button, or the like for operating traveling and turning performed by the traveling unit 2 and various types of work performed by the work unit 3, and outputs, to the control device 4, an operation signal according to an operation performed by an operator. For example, the manipulation unit 6 includes a safety operation member such as a cutoff lever 9, and when the cutoff lever 9 is lowered, a cutoff switch (not shown) is turned on to cause the hydraulic actuator of the work unit 3 to be drivable. On the other hand, when the cutoff lever 9 is raised, the cutoff switch is turned off to cause the hydraulic actuator of the work unit 3 to be undrivable. The manipulation unit 6 includes, for example, a sensor that detects the action state (ON state or OFF state) of the cutoff switch, and enables output of the action state of the cutoff switch, that is, the operation state of the cutoff lever 9, to the display device 7 and the like.

The display device 7 is a device for the construction machine 1, and has a device body 10 including a control unit 11, a storage unit 12, a display unit 13, and an operation unit 14.

The control unit 11 is composed of a CPU and the like, and controls the action of the components of the display device 7. The storage unit 12 is composed of a storage medium such as a ROM or a RAM, and stores a program and data for controlling the display device 7. The control unit 11 performs arithmetic processing based on the program and data stored in the storage unit 12 to control the components and functions of the display device 7. For example, the control unit 11 executes the program to function as an operation control unit 20 and a display control unit 21. Furthermore, the display device 7 receives the operation state of the cutoff lever 9 from the manipulation unit 6. The display device 7 may be configured such that one of a plurality of operation modes is set for the display device 7 and that the control unit 11 controls the components and functions of the display device 7 according to the set operation mode.

As shown in FIGS. 2 to 5, the display unit 13 is composed of a liquid crystal display provided on the front side of the device body 10, and is controlled by the display control unit 21 to display various screens.

The operation unit 14 receives an input operation and a setting operation on various types of information that are performed by an operator, and for example, as shown in FIGS. 2 to 5, the operation unit 14 is provided on one side with respect to the display unit 13 (e.g., below the screen of the display unit 13) on the front side of the device body 10. The operation unit 14 includes a plurality of operation elements 15 that are arranged at a predetermined interval in a predetermined arrangement direction (e.g., left-right direction). Each of the plurality of operation elements 15 is composed of a pressable button or the like, and outputs an operation signal to the control unit 11 according to a pressing operation performed by an operator.

When one of the plurality of operation elements 15 is operated, the display device 7 performs an operation content corresponding to the one of the plurality of operation elements 15. In the present embodiment, the operation contents of the respective plurality of operation elements 15 are set in advance for each operation state of the cutoff lever 9 and stored in the storage unit 12. The operation contents of the respective plurality of operation elements 15 may be set in advance for each operation mode and stored in the storage unit 12. Furthermore, the operation contents of the respective plurality of operation elements 15 may be set in advance for each destination of the construction machine 1 and stored in the storage unit 12. In the present embodiment, an example will be described in which, as shown in FIGS. 2 to 5, the plurality of operation elements 15 are composed of a first operation element 15a to a sixth operation element 15f; however, the present invention is not limited to this example, and the operation unit 14 only needs to include two or more operation elements 15.

Figure 2:
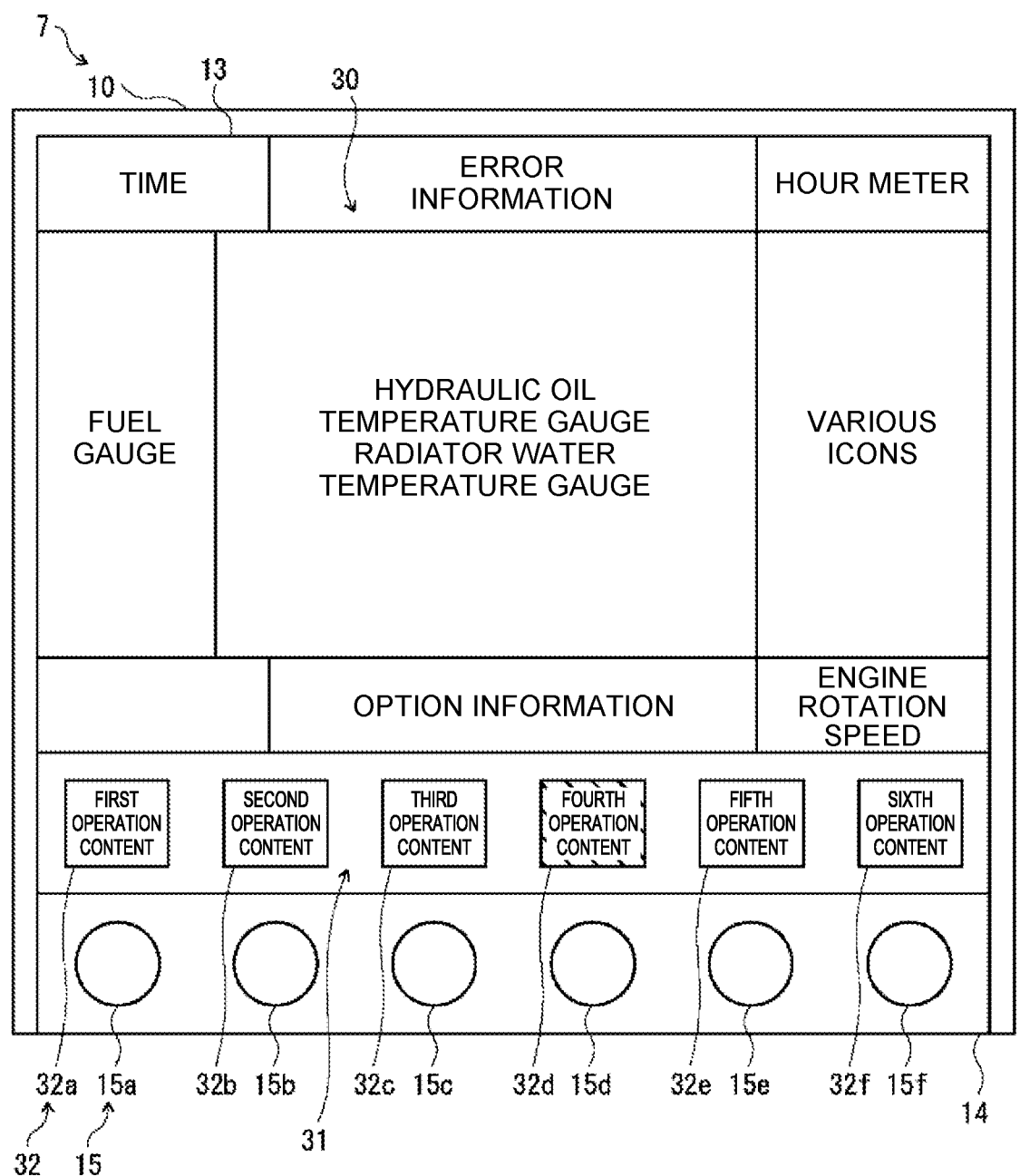
FIG. 2 is a front view showing an example of a display device of the construction machine according to the embodiment of the present invention.

For example, when the operation content of the fourth operation element 15d is highly related to whether the work unit 3 is in a drivable state or in an undrivable state, different operation contents are set in advance for each operation state of the cutoff lever 9. In this case, when the cutoff lever 9 is in the raised state (when the work unit 3 is undrivable), as shown in FIG. 2, a first operation content is set to correspond to the first operation element 15a, a second operation content is set to correspond to the second operation element 15b, a third operation content is set to correspond to the third operation element 15c, a fourth operation content (e.g., a content operable even when the work unit 3 is undrivable) is set to correspond to the fourth operation element 15d, a fifth operation content is set to correspond to the fifth operation element 15e, and a sixth operation content is set to correspond to the sixth operation element 15f.

Figure 3:
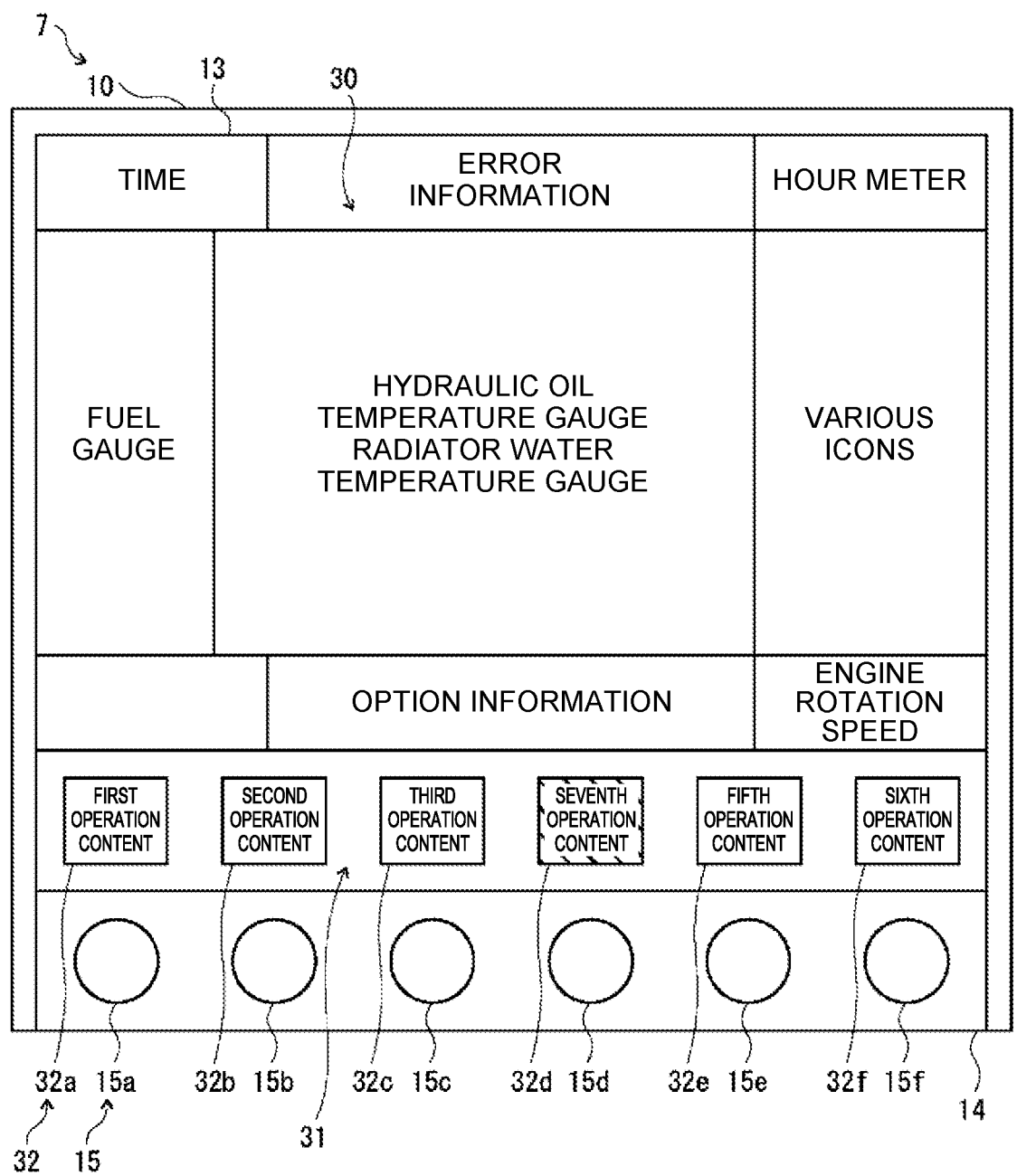
FIG. 3 is a front view showing an example of the display device of the construction machine according to the embodiment of the present invention.

On the other hand, when the cutoff lever 9 is in the lowered state (when the work unit 3 is drivable), as shown in FIG. 3, the first operation content is set to correspond to the first operation element 15*a*, the second operation content is set to correspond to the second operation element 15*b*, the third operation content is set to correspond to the third operation element 15*c*, a seventh operation content (e.g., a content operable when the work unit 3 is drivable) is set to correspond to the fourth operation element 15*d*, the fifth operation content is set to correspond to the fifth operation element 15*e*, and the sixth operation content is set to correspond to the sixth operation element 15*f*.

Figure 4:
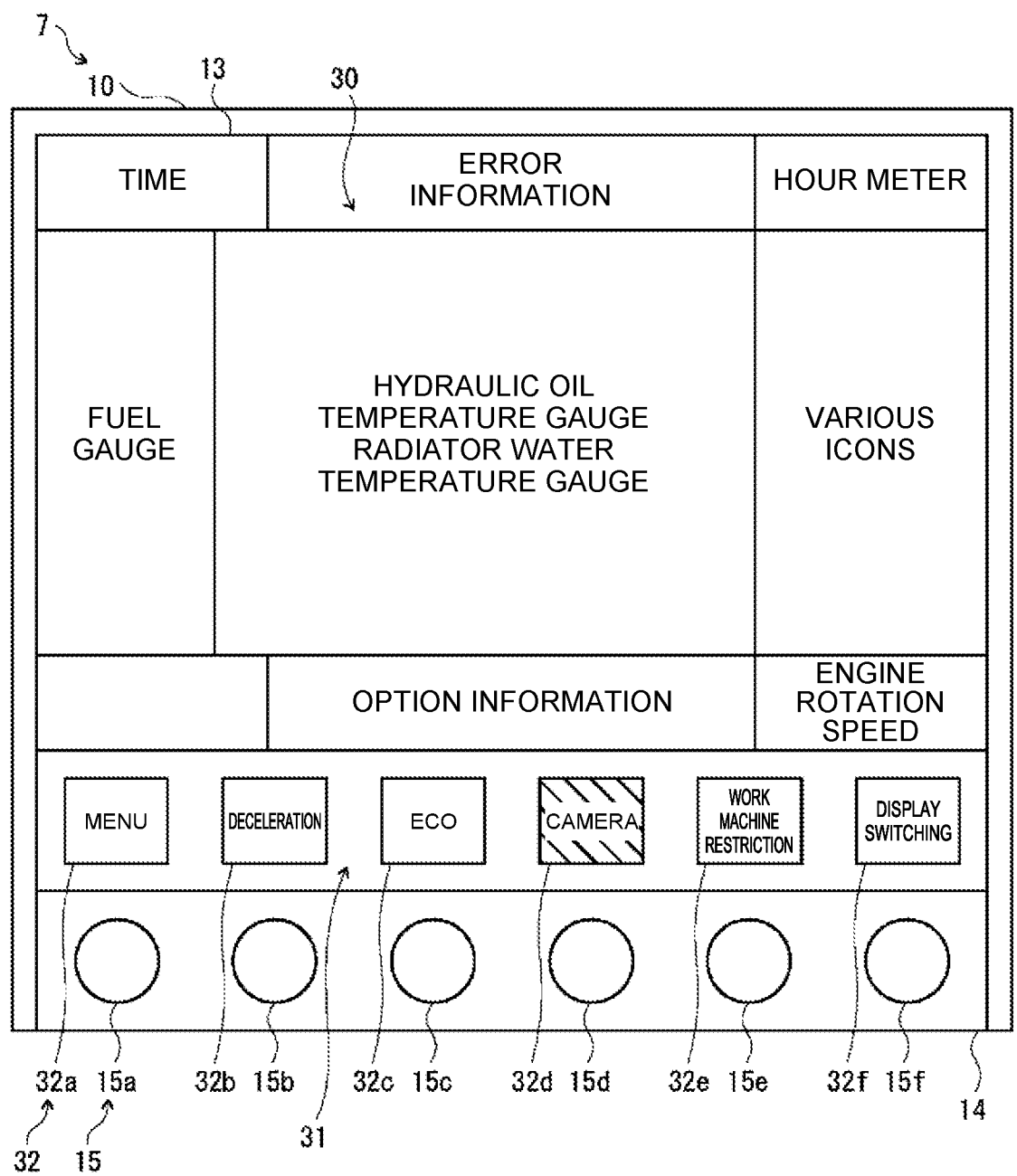
FIG. 4 is a front view showing an example of the display device of the construction machine according to the embodiment of the present invention.

Specifically, when a display screen for a predetermined operation mode is displayed on the display unit 13 while the cutoff lever 9 is in the raised state, as shown in FIG. 4, a "menu screen display" is set as the first operation content corresponding to the first operation element 15*a*, a "deceleration setting screen display" is set as the second operation content corresponding to the second operation element 15*b*, an "eco setting screen display" is set as the third operation content corresponding to the third operation element 15*c*, a "camera mode screen display" is set as the fourth operation content corresponding to the fourth operation element 15*d*, a "work machine restriction screen display" is set as the fifth operation content corresponding to the fifth operation element 15*e*, and a "display switching" is set as the sixth operation content corresponding to the sixth operation element 15*f*.

Figure 5:
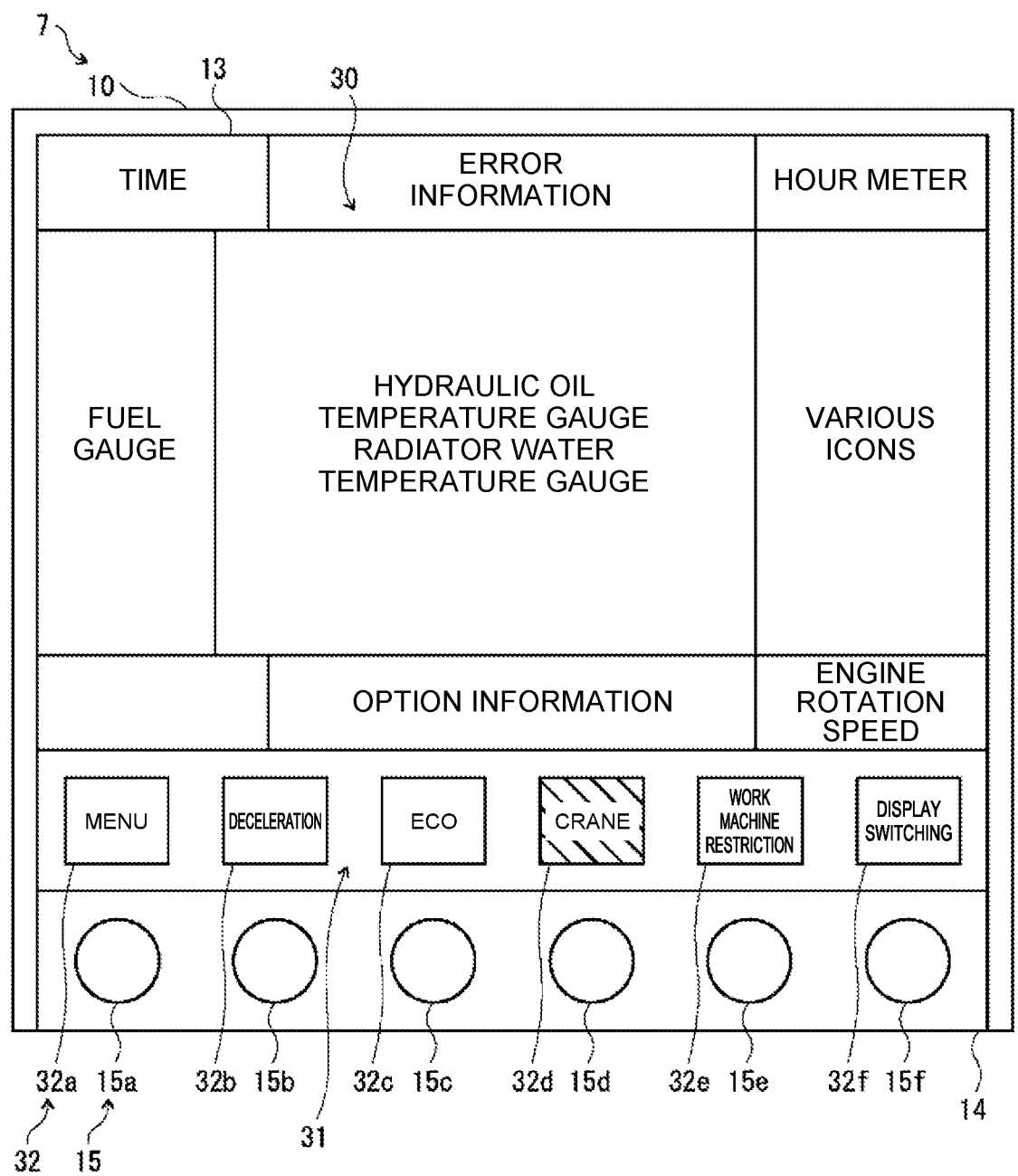
FIG. 5 is a front view showing an example of the display device of the construction machine according to the embodiment of the present invention.

On the other hand, while the cutoff lever 9 is in the lowered state, as shown in FIG. 5, the operation content corresponding to the fourth operation element 15*d* is changed to a "crane mode screen display" as the seventh operation content from the "camera mode screen display" as the fourth operation content while the cutoff lever 9 is in the raised state.

The operation control unit 20 sets for (allocates to) each of the plurality of operation elements 15 an operation content corresponding to the operation mode according to the operation state of the cutoff lever 9. Furthermore, the operation control unit 20 receives an operation signal from each of the plurality of operation elements 15, and outputs, to the control device 4 and the display control unit 21, an operation signal corresponding to the operation content set for the corresponding operation element 15 in order to perform the operation content.

For example, irrespective of the operation state of the cutoff lever 9, the operation control unit 20 sets the first operation content to correspond to the first operation element 15*a*, and according to an operation signal of the first operation element 15*a*, the operation control unit 20 outputs, to the control device 4 and the display control unit 21, an operation signal corresponding to the first operation content. When the cutoff lever 9 is in the raised state, the operation control unit 20 sets the fourth operation content to correspond to the fourth operation element 15*d*, and according to an operation signal of the fourth operation element 15*d*, the operation control unit 20 outputs, to the control device 4 and the display control unit 21, an operation signal corresponding to the fourth operation content. On the other hand, when the cutoff lever 9 is in the lowered state, the operation control unit 20 sets the seventh operation content to correspond to the fourth operation element 15*d*, and according to an operation signal of the fourth operation element 15*d*, the operation control unit 20 outputs, to the control device 4 and the display control unit 21, an operation signal corresponding to the seventh operation content.

The display control unit 21 causes the display unit 13 to display various screens according to the operation mode set for the display device 7. The display control unit 21 displays a first display area 30 and a second display area 31 on various screens of the display unit 13. The second display area 31 is displayed on one side with respect to the first display area 30 (e.g., below the first display area 30 on the screen of the display unit 13).

The display control unit 21 displays information corresponding to the set operation mode in the first display area 30. For example, as shown in FIGS. 2 to 5, when a display screen for a predetermined operation mode is displayed on the display unit 13, the display control unit 21 displays time, error information, an hour meter, the amount of residual fuel, the hydraulic oil temperature and cooling water temperature, various icons, option information, the engine rotation speed, and the like in the first display area 30.

The display control unit 21 displays the second display area 31 as a guidance display area for providing guidance on the operation contents with respect to the display device 7. In the second display area 31 as a guidance display area, the display control unit 21 displays a plurality of function signs 32 that indicate the operation contents corresponding to the respective plurality of operation elements 15 so that the plurality of function signs 32 are arranged at a predetermined interval in a predetermined arrangement direction (e.g., left-right direction). In the present embodiment, as shown in FIGS. 2 to 5, the display control unit 21 displays, as the plurality of function signs 32, a first function sign 32*a* corresponding to the first operation element 15*a* to a sixth function sign 32*f* corresponding to the sixth operation element 15*f* in this order.

The display control unit 21 controls the display unit 13 to change a display mode of the second display area 31 according to the operation state of the cutoff lever 9. In this case, when the cutoff lever 9 is in the raised state, the display control unit 21 changes the display mode of the second display area 31 (e.g., the display content of the function signs 32) to display a content operable even when the work unit 3 is undrivable. On the other hand, when the cutoff lever 9 is in the lowered state, the display control unit 21 changes the display mode of the second display area 31 (e.g., the display content of the function signs 32) to display a content operable when the work unit 3 is drivable.

For example, as shown in FIG. 2, when the cutoff lever 9 is in the raised state, the display control unit 21 displays the first function sign 32*a* indicating the first operation content set for the first operation element 15*a*, displays the second function sign 32*b* indicating the second operation content set for the second operation element 15*b*, displays the third function sign 32*c* indicating the third operation content set for the third operation element 15*c*, displays the fourth function sign 32*d* indicating the fourth operation content set for the fourth operation element 15*d*, displays the fifth function sign 32*e* indicating the fifth operation content set for the fifth operation element 15*e*, and displays the sixth function sign 32*f* indicating the sixth operation content set for the sixth operation element 15*f*.

On the other hand, as shown in FIG. 3, when the cutoff lever 9 is in the lowered state, the display control unit 21 displays the first function sign 32*a* indicating the first operation content set for the first operation element 15*a*, displays the second function sign 32*b* indicating the second operation content set for the second operation element 15*b*, displays the third function sign 32*c* indicating the third operation content set for the third operation element 15*c*, displays the fourth function sign 32*d* indicating the seventh operation content set for the fourth operation element 15d, displays the fifth function sign 32e indicating the fifth operation content set for the fifth operation element 15e, and displays the sixth function sign 32f indicating the sixth operation content set for the sixth operation element 15f.

In other words, when the cutoff lever 9 is operated to switch from the lowered state to the raised state, the display control unit 21 changes the fourth function sign 32d from the seventh operation content to the fourth operation content, and when the cutoff lever 9 is operated to switch from the raised state to the lowered state, the display control unit 21 changes the fourth function sign 32d from the fourth operation content to the seventh operation content.

Specifically, as shown in FIG. 4, when a display screen for a predetermined operation mode is displayed on the display unit 13, in the second display area 31, the display control unit 21 displays, as the first function sign 32a, "MENU" indicating the "menu screen display" set for the first operation element 15a, displays, as the second function sign 32b, "DECELERATION" indicating the "deceleration setting screen display" set for the second operation element 15b, displays, as the third function sign 32c, "ECO" indicating the "eco setting screen display" set for the third operation element 15c, displays, as the fifth function sign 32e, "WORK MACHINE RESTRICTION" indicating the "work machine restriction screen display" set for the fifth operation element 15e, and displays, as the sixth function sign 32f, "DISPLAY SWITCHING" indicating the "display switching" set for the sixth operation element 15f.

In particular, when the cutoff lever 9 is in the raised state, as shown in FIG. 4, the display control unit 21 displays, as the fourth function sign 32d, "CAMERA" indicating the "camera mode screen display" set for the fourth operation element 15d, and when the cutoff lever 9 is in the lowered state, as shown in FIG. 5, the display control unit 21 displays, as the fourth function sign 32d, "CRANE" indicating the "crane mode screen display" set for the fourth operation element 15d.

The display control unit 21 may highlight each of the function signs 32 whose operation content has been changed. For example, the display control unit 21 may highlight the corresponding function sign 32 by causing the background or frame line of the function sign 32 or the color of letters or symbols representing the operation content indicated by the function sign 32 to be different from that of the other function signs 32. Alternatively, the display control unit 21 may highlight the corresponding function sign 32 by lighting or blinking the background or frame line of the function sign 32 or the letters or symbols representing the operation content indicated by the function sign 32, or by applying other highlighting methods.

The operation device 8 is provided separately from the display device 7, and in place of the operation elements 15 of the display device 7, the operation device 8 receives an input operation and a setting operation on various types of information that are performed with respect to the display device 7. The operation device 8 is composed of, for example, a jog dial, and includes at least a rotation operation unit 16 that receives a rotation operation, and a pressing operation unit 17 that receives a pressing operation. The rotation operation unit 16 is used to move a cursor displayed on the display unit 13 of the display device 7 to select a selection candidate such as the plurality of function signs 32, and outputs, to the display device 7, an operation signal corresponding to the rotation operation. The pressing operation unit 17 is used to select and determine a selection candidate at the position of the cursor displayed on the display unit 13, and outputs, to the display device 7, an operation signal corresponding to the pressing operation.

The display device 7 and the operation device 8 are capable of performing an action in conjunction with each other. The operation device 8 receives a selection operation, an input operation, a setting operation, and the like for an operation target displayed by the display device 7, and the display device 7 causes a transition of (change in) the display of the operation target according to the operation of the operation device 8.

In the example described in the above embodiment, the display device 7 is configured such that the display control unit 21 displays the second display area 31 below the first display area 30 on the screen of the display unit 13 and that the plurality of operation elements 15 are included in the operation unit 14 provided below the screen of the display unit 13 on the front side of the device body 10; however, the present invention is not limited to this example. For example, the display device 7 may be configured such that the display control unit 21 displays the second display area 31 above the first display area 30 on the screen of the display unit 13 and that the plurality of operation elements 15 are included in the operation unit 14 provided above the screen of the display unit 13 on the front side of the device body 10.

In the example described in the above embodiment, the display control unit 21 changes the display mode of the second display area 31 according to the operation state of the cutoff lever 9 as a safety operation member; however, the present invention is not limited to this example. For example, the display control unit 21 may change the display mode of the second display area 31 according to the operation state of any member of the construction machine 1 for performing a safety operation other than the cutoff lever 9.

Figure 6:
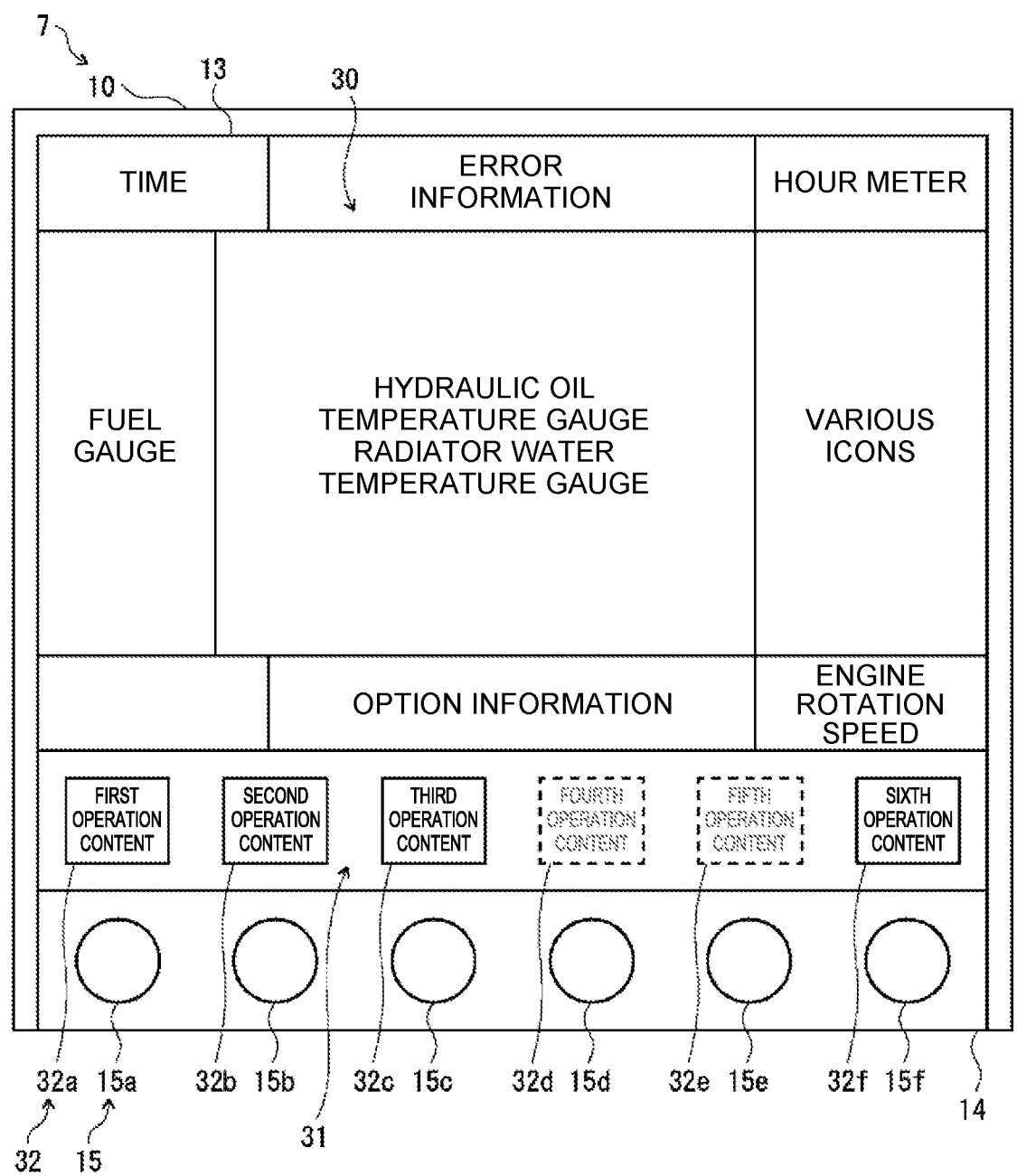
FIG. 6 is a front view showing an example of a first modification of the display device of the construction machine according to the embodiment of the present invention.
Figure 7:
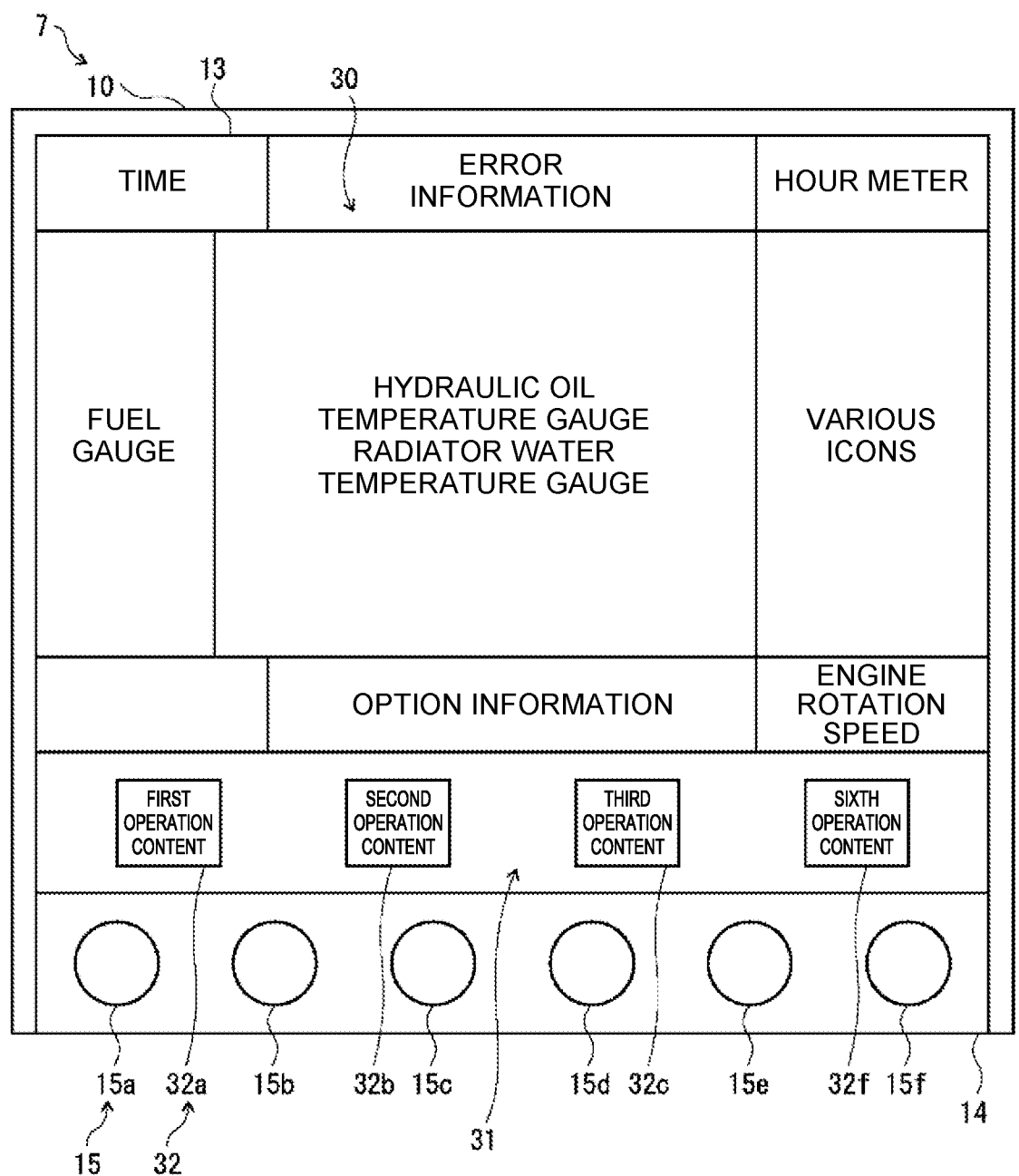
FIG. 7 is a front view showing another example of the first modification of the display device of the construction machine according to the embodiment of the present invention.

In the example described in the above embodiment, as shown in FIGS. 2 to 5, the display control unit 21 of the display device 7 changes the display content of the function signs 32 to change the display mode of the second display area 31 according to the operation state of the cutoff lever 9; however, the present invention is not limited to this example. In a first modification, as shown in FIGS. 6 and 7, the display control unit 21 may hide or gray out at least one of the function signs 32 as a change in the display mode of the second display area 31 corresponding to the operation state of the cutoff lever 9. When the rotation operation unit 16 of the operation device 8 moves the cursor for selection of the plurality of function signs 32 as a selection candidate, the operation device 8 may skip the hidden at least one of the function signs 32 when receiving a selection operation, and the display device 7 may skip the hidden at least one of the function signs 32 when moving the cursor.

For example, in the first modification, as shown in FIG. 6, without changing the layout such as the arrangement of the plurality of function signs 32, the display control unit 21 hides or grays out each of the function signs 32 indicating the operation content that becomes inactive according to the operation state of the cutoff lever 9.

Specifically, when the cutoff lever 9 is in the lowered state, the first operation content of the first operation element 15a, the second operation content of the second operation element 15b, the third operation content of the third operation element 15c, the fourth operation content of the fourth operation element 15d, the fifth operation content of the fifth operation element 15e, and the sixth operation content of the sixth operation element 15f are active, and when the cutoff lever 9 is in the raised state, the fourth operation content and the fifth operation content are inactive. In this case, when the cutoff lever 9 is in the raised state, as shown in FIG. 6, the display control unit 21 hides the fourth function sign 32d indicating the fourth operation content and the fifth function sign 32e indicating the fifth operation content, without changing the layout such as the arrangement of the first function sign 32a to the sixth function sign 32f.

Alternatively, in the first modification, as shown in FIG. 7, the display control unit 21 may hide each of the function signs 32 indicating the operation content that becomes inactive according to the operation state of the cutoff lever 9, and change the layout such as the arrangement of the remaining function signs 32.

Specifically, when the cutoff lever 9 is in the lowered state, the first operation content of the first operation element 15a, the second operation content of the second operation element 15b, the third operation content of the third operation element 15c, the fourth operation content of the fourth operation element 15d, the fifth operation content of the fifth operation element 15e, and the sixth operation content of the sixth operation element 15f are active, and when the cutoff lever 9 is in the raised state, the fourth operation content and the fifth operation content are inactive. In this case, when the cutoff lever 9 is in the raised state, as shown in FIG. 7, the display control unit 21 hides the fourth function sign 32d indicating the fourth operation content and the fifth function sign 32e indicating the fifth operation content, and displays the first function sign 32a, the second function sign 32b, the third function sign 32c, and the sixth function sign 32f that are arranged at a predetermined interval in a predetermined arrangement direction.

Figure 8:
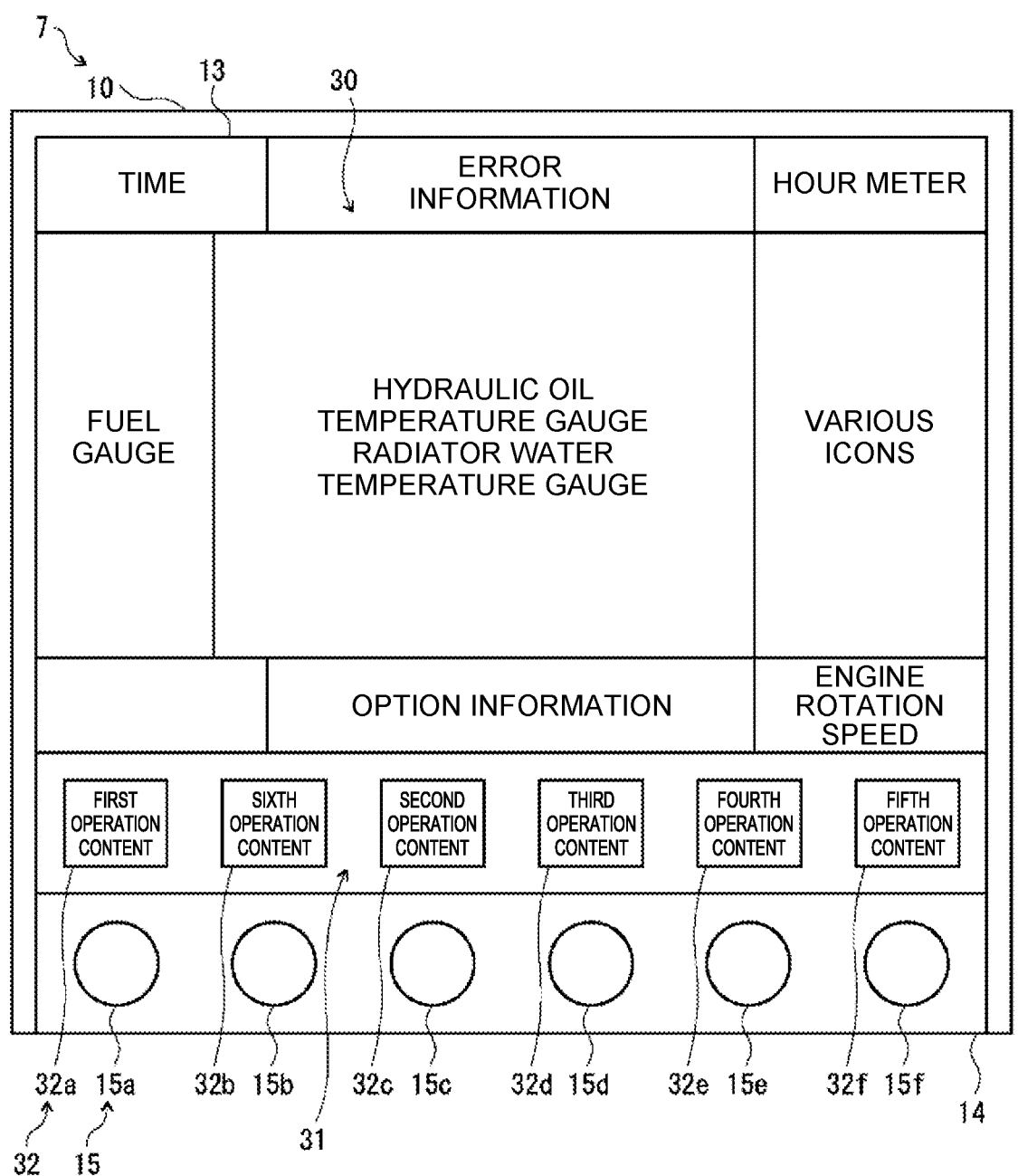
FIG. 8 is a front view showing a second modification of the display device of the construction machine according to the embodiment of the present invention.

In a second modification, as shown in FIG. 8, the display control unit 21 may change the arrangement order of the plurality of function signs 32 as a change in the display mode of the second display area 31 corresponding to the operation state of the cutoff lever 9. When the rotation operation unit 16 of the operation device 8 moves the cursor for selection of the plurality of function signs 32 as a selection candidate, the operation device 8 may receive a selection operation for the function signs 32 based on the changed arrangement order, and the display device 7 may move the cursor based on the changed arrangement order.

Specifically, when the cutoff lever 9 is in the lowered state, the display control unit 21 displays the first function sign 32a indicating the first operation content of the first operation element 15a, the second function sign 32b indicating the second operation content of the second operation element 15b, the third function sign 32c indicating the third operation content of the third operation element 15c, the fourth function sign 32d indicating the fourth operation content of the fourth operation element 15d, the fifth function sign 32e indicating the fifth operation content of the fifth operation element 15e, and the sixth function sign 32f indicating the sixth operation content of the sixth operation element 15f that are arranged in this order in a predetermined arrangement direction. In this case, when the cutoff lever 9 is in the raised state, the sixth operation content has a higher frequency of appearance and priority than the second operation content, the third operation content, the fourth operation content, and the fifth operation content.

Thus, when the cutoff lever 9 is in the raised state, in order to arrange the operation contents indicated by the plurality of function signs 32 in the order of the first operation content, the sixth operation content, the second operation content, the third operation content, the fourth operation content, and the fifth operation content, as shown in FIG. 8, the operation control unit 20 sets the first operation content to correspond to the first operation element 15a, sets the sixth operation content to correspond to the second operation element 15b, sets the second operation content to correspond to the third operation element 15c, sets the third operation content to correspond to the fourth operation element 15d, sets the fourth operation content to correspond to the fifth operation element 15e, and sets the fifth operation content to correspond to the sixth operation element 15f. Then, when the cutoff lever 9 is in the raised state, as shown in FIG. 8, the display control unit 21 displays the first function sign 32a indicating the first operation content set for the first operation element 15a, displays the second function sign 32b indicating the sixth operation content set for the second operation element 15b, displays the third function sign 32c indicating the second operation content set for the third operation element 15c, displays the fourth function sign 32d indicating the third operation content set for the fourth operation element 15d, displays the fifth function sign 32e indicating the fourth operation content set for the fifth operation element 15e, and displays the sixth function sign 32f indicating the fifth operation content set for the sixth operation element 15f. Thus, the display control unit 21 changes the arrangement order of the plurality of function signs 32, and the operation control unit 20 changes the arrangement order of the plurality of operation elements 15.

Figure 9:
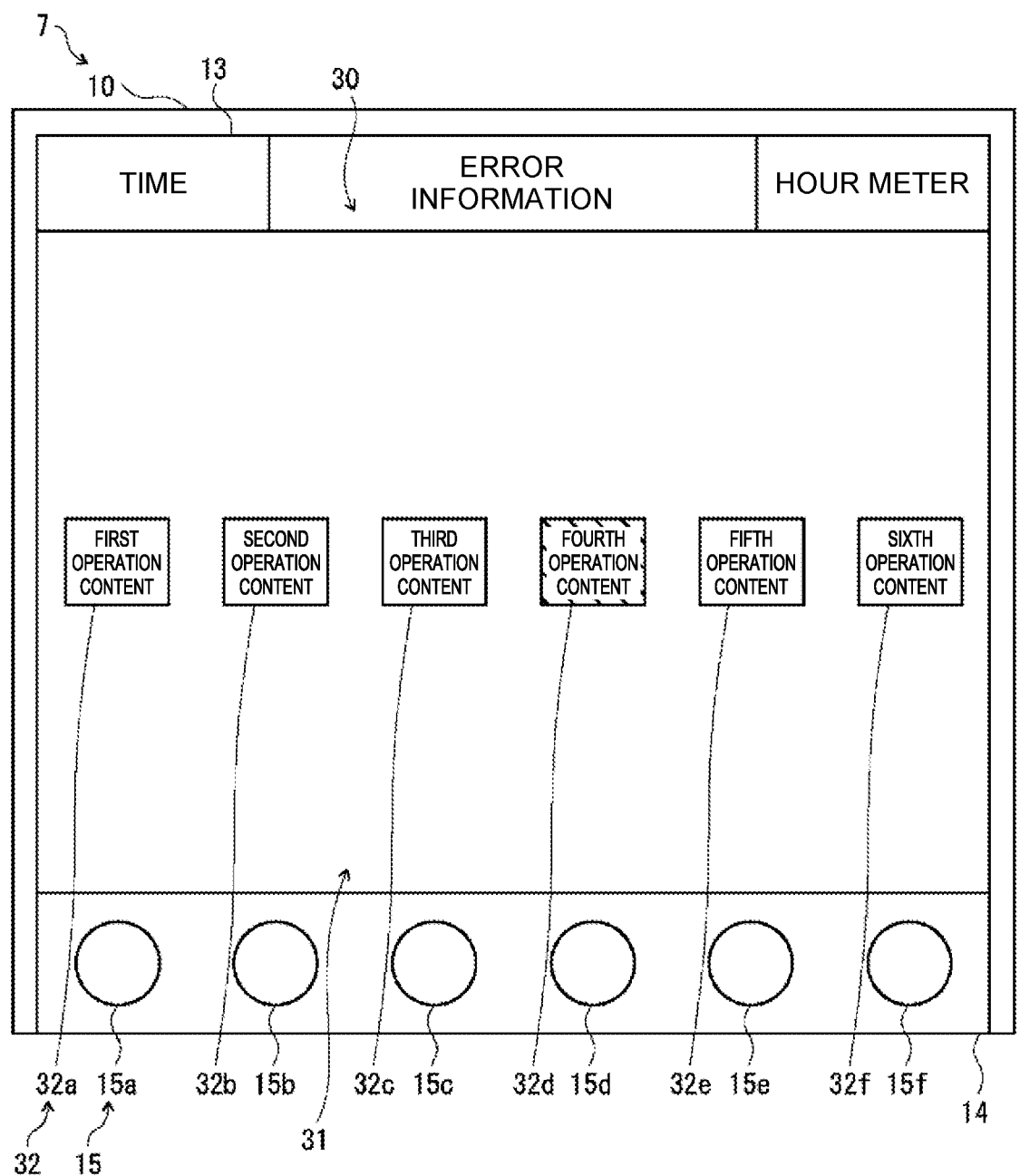
FIG. 9 is a front view showing a third modification of the display device of the construction machine according to the embodiment of the present invention.

In a third modification, as shown in FIG. 9, the display control unit 21 may change the allocation of the second display area 31 on the display screen as a change in the display mode of the second display area 31 corresponding to the operation state of the cutoff lever 9.

Specifically, when the cutoff lever 9 is in the lowered state, the display control unit 21 displays the second display area 31 by allocating the second display area 31 on one side with respect to the first display area 30 (e.g., below the first display area 30 on the screen of the display unit 13), and when the cutoff lever 9 is in the raised state, the display control unit 21 displays the second display area 31 by allocating the second display area 31 so that the second display area 31 is enlarged to be displayed on the entire display screen irrespective of the display of the first display area 30. Alternatively, the display control unit 21 may apply other allocation methods such as displaying the second display area 31 in the center of the display screen or displaying the second display area 31 in a pop-up window on the display screen.

Figure 10:
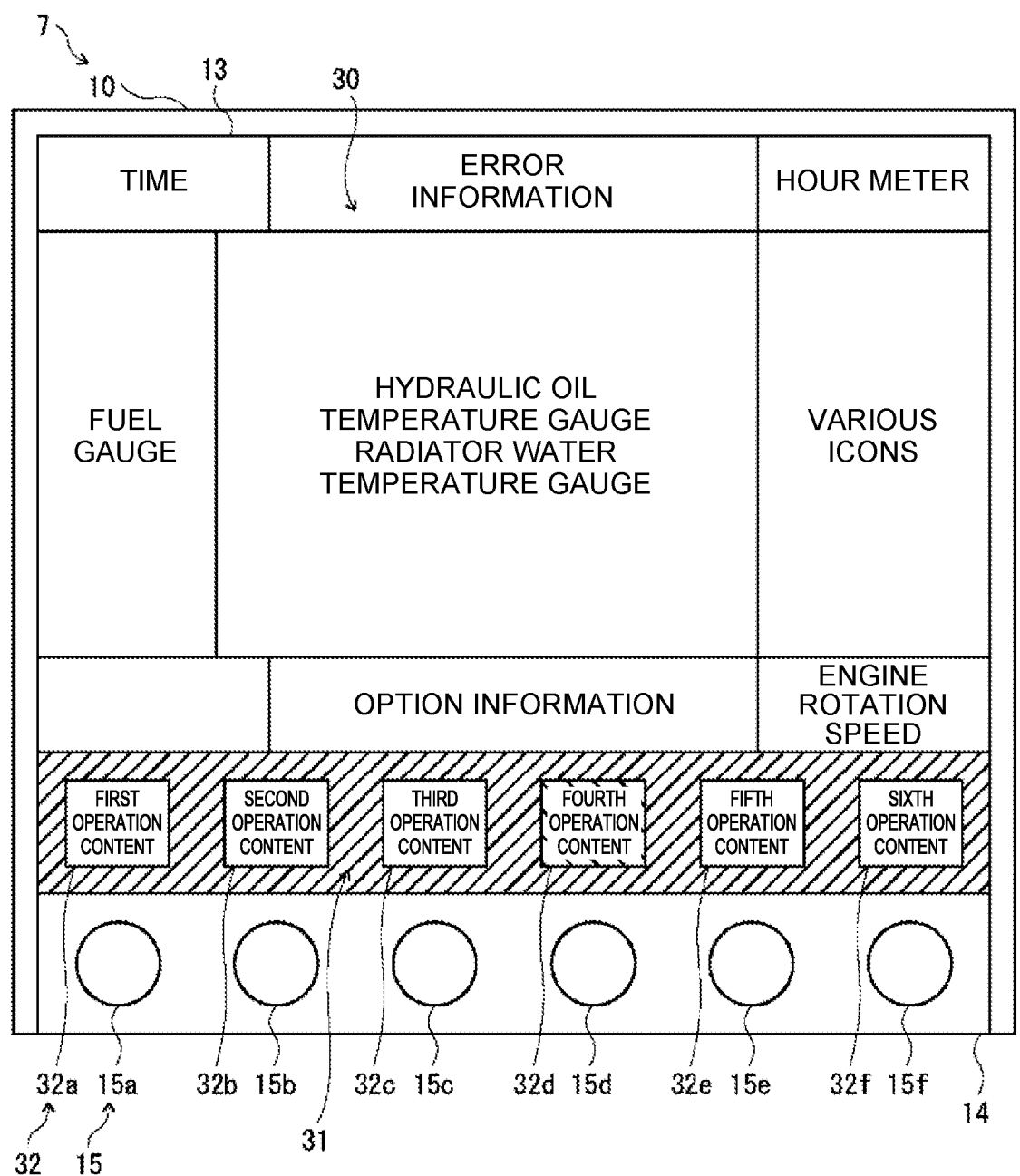
FIG. 10 is a front view showing a fourth modification of the display device of the construction machine according to the embodiment of the present invention.

In a fourth modification, as shown in FIG. 10, the display control unit 21 may change the background of the second display area 31 (the background for the function signs 32) on the display screen as a change in the display mode of the second display area 31 corresponding to the operation state of the cutoff lever 9.

Specifically, the display control unit 21 displays the second display area 31 with different background colors or patterns depending on whether the cutoff lever 9 is in the lowered state or in the raised state. The display control unit 21 may change the color or pattern of a partition area of the background of the second display area 31 that defines the periphery of each of the function signs 32 indicating the operation content that becomes inactive according to the operation state of the cutoff lever 9.

As described above, in the present embodiment, the display device 7 mounted on the construction machine 1 includes the control unit 11 and the display unit 13. The display unit 13 displays a display screen having the second display area 31 which is a guidance display area for providing guidance on the operation contents with respect to the display device 7. The control unit 11 functions as the display control unit 21 that controls the display unit 13 to change the display mode of the second display area 31 according to the operation state of the cutoff lever 9 which is a safety operation member of the construction machine 1.

Thus, the display device 7 can change the display mode of the second display area 31 according to the operation state of the cutoff lever 9, allowing an operator to easily understand the guidance on the operation contents with respect to the display device 7. This enables the display device 7 to have higher operability for an operator irrespective of the operation of the cutoff lever 9.

For example, the display unit 13 displays a display screen on which the function signs 32 indicating the operation contents are arranged in the second display area 31, and the display control unit 21 changes the display mode for the function signs 32 according to the operation state of the cutoff lever 9.

Thus, even when the operation contents indicated by the function signs 32 are changed according to the operation state of the cutoff lever 9, the display device 7 can change the display mode for the function signs 32, allowing an operator to easily understand the guidance on the operation contents indicated by the function signs 32. Furthermore, the display device 7 requires the minimum number of function signs 32 indicating the operation contents, thus requiring the minimum number of operation elements 15 corresponding to the function signs 32.

In the first modification, the display unit 13 may display one of a plurality of first partition displays 33 in a display mode different from that for the other first partition displays 33. The display unit 13 may display a display screen on which the plurality of function signs 32 indicating the respective plurality of operation contents are arranged in the second display area 31, and the display control unit 21 may hide at least one of the function signs 32 according to the operation state of the cutoff lever 9.

Thus, the display device 7 can hide each of the function signs 32 indicating the operation content that becomes inactive according to the operation state of the cutoff lever 9, preventing an operator from performing an erroneous operation for the corresponding function sign 32.

In the first modification, the display control unit 21 may change the arrangement of the function signs 32 in the second display area 31 according to the operation state of the cutoff lever 9.

Thus, the display device 7 can change the arrangement of each of the function signs 32 indicating the operation content that becomes active according to the operation state of the cutoff lever 9, providing guidance on an operation performed by an operator for the corresponding function sign 32. Furthermore, the display device 7 can change the arrangement of each of the function signs 32 indicating the operation content that becomes inactive according to the operation state of the cutoff lever 9, preventing an operator from performing an erroneous operation for the corresponding function sign 32.

In the second modification, the display unit 13 may display a display screen on which the plurality of function signs 32 are arranged in a predetermined arrangement order in the second display area 31, and the display control unit 21 may change the arrangement order of the plurality of function signs 32 in the second display area 31 according to the operation state of the cutoff lever 9.

Thus, the display device 7 can change the arrangement order of each of the function signs 32 indicating the operation content that becomes active according to the operation state of the cutoff lever 9, providing guidance on an operation performed by an operator for the corresponding function sign 32. Furthermore, the display device 7 can change the arrangement order of each of the function signs 32 indicating the operation content that becomes inactive according to the operation state of the cutoff lever 9, preventing an operator from performing an erroneous operation for the corresponding function sign 32.

In the third modification, the display control unit 21 may change the allocation of the second display area 31 on the display screen according to the operation state of the cutoff lever 9.

Thus, the display device 7 can change the allocation to highlight the second display area 31 whose display mode is changed according to the operation state of the cutoff lever 9, preventing an operator from performing an erroneous operation.

In the fourth modification, the display control unit 21 may change the background of the second display area 31 on the display screen according to the operation state of the cutoff lever 9.

Thus, the display device 7 can change the background to highlight the second display area 31 whose display mode is changed according to the operation state of the cutoff lever 9, preventing an operator from performing an erroneous operation.

In the example described in the above embodiments, the display device 7 is applied to the construction machine 1; however, the present invention is not limited to this example. For example, in other embodiments, the display device 7 may be applied to a work machine other than the construction machine 1.

The present invention can be appropriately modified without departing from the gist or idea of the invention readable from the claims and the entire specification, and a display device and a construction machine with such a modification are also included in the technical idea of the present invention.

APPENDICES

The following appendices are a summary of the present disclosure extracted from the embodiments described above. Configurations and processing functions described in the following appendices may be selected and combined as appropriate.

Appendix 1

A display device mounted on a construction machine, the display device including: a display unit that displays a display screen having a guidance display area for providing guidance on an operation content with respect to the display device; and a display control unit that controls the display unit to change a display mode of the guidance display area according to an operation state of a safety operation member of the construction machine.

Appendix 2

The display device according to appendix 1, wherein the display unit displays the display screen on which a function sign indicating the operation content is arranged in the guidance display area, and the display control unit changes a display mode for the function sign according to the operation state of the safety operation member.

Appendix 3

The display device according to appendix 2, wherein the display unit displays the display screen on which a plurality of the function signs indicating a plurality of the operation contents, respectively, are arranged in the guidance display area, and the display control unit hides at least one of the function signs according to the operation state of the safety operation member.

Appendix 4

The display device according to appendix 2 or 3, wherein the display control unit changes an arrangement of the function sign or the function signs in the guidance display area according to the operation state of the safety operation member.

Appendix 5

The display device according to appendix 2, wherein the display unit displays the display screen on which a plurality of the function signs are arranged in a predetermined arrangement order in the guidance display area, and the display control unit changes the arrangement order of the plurality of function signs in the guidance display area according to the operation state of the safety operation member.

Appendix 6

The display device according to any one of appendices 1 to 5, wherein the display control unit changes an allocation of the guidance display area on the display screen according to the operation state of the safety operation member.

Appendix 7

The display device according to any one of appendices 1 to 6, wherein the display control unit changes a background of the guidance display area on the display screen according to the operation state of the safety operation member.

Appendix 8

A construction machine including a display device, wherein the display device includes: a display unit that displays a display screen having a guidance display area for providing guidance on an operation content with respect to the display device; and a display control unit that controls the display unit to change a display mode of the guidance display area according to an operation state of a safety operation member of the construction machine.

Appendix 9

The display device according to appendix 8, wherein the display unit displays the display screen on which a function sign indicating the operation content is arranged in the guidance display area, and the display control unit changes a display mode for the function sign according to the operation state of the safety operation member.

Appendix 10

The display device according to appendix 9, wherein the display unit displays the display screen on which a plurality of the function signs indicating a plurality of the operation contents, respectively, are arranged in the guidance display area, and the display control unit hides at least one of the function signs according to the operation state of the safety operation member.

Appendix 11

The display device according to appendix 9 or 10, wherein the display control unit changes an arrangement of the function sign or the function signs in the guidance display area according to the operation state of the safety operation member.

Appendix 12

The display device according to appendix 9, wherein the display unit displays the display screen on which a plurality of the function signs are arranged in a predetermined arrangement order in the guidance display area, and the display control unit changes the arrangement order of the plurality of function signs in the guidance display area according to the operation state of the safety operation member.

Appendix 13

The display device according to any one of appendices 8 to 12, wherein the display control unit changes an allocation of the guidance display area on the display screen according to the operation state of the safety operation member.

Appendix 14

The display device according to any one of appendices 8 to 13, wherein the display control unit changes a background of the guidance display area on the display screen according to the operation state of the safety operation member.

REFERENCE SIGNS LIST

1 Construction machine
2 Traveling unit
3 Work unit
6 Manipulation unit
7 Display device
9 Cutoff lever (safety operation member)
11 Control unit
13 Display unit
15 Operation element
20 Operation control unit
21 Display control unit
31 Second display area (guidance display area)
32 Function sign

The invention claimed is:

1. A display device mounted on a construction machine capable of executing a plurality of operation contents, each operation content corresponding to an operation element in a plurality of operation elements, the display device comprising:
   a display unit that displays a display screen having a guidance display area for displaying a plurality of function signs at positions corresponding to the plurality of operation elements, wherein each function sign in the plurality of function signs corresponds to an operation content in the plurality of operation contents; and
   a display control unit that controls the display unit to change a display mode of the guidance display area according to an operation state of a safety operation member of the construction machine which sets whether the operation state of a work unit of the construction machine is in a drivable state or in an undrivable state, wherein the display control unit
- changes an arrangement and a display mode of at least one of the plurality of displayed function signs relative to the plurality of operation elements according to the operation state of the safety operation member, and
- changes, for each of the plurality of operation elements, the corresponding operation content to correspond to the displayed function signs.

2. The display device according to claim 1, wherein each function sign is indicative of the corresponding operation content.

3. The display device according to claim 2, wherein the display control unit hides from display at least one function sign of the plurality of function signs according to the operation state of the safety operation member.

4. The display device according to claim 2, wherein
the display unit displays an initial arrangement order of the plurality of function signs on the display screen, and
the display control unit changes the initial arrangement order of the plurality of function signs in the guidance display area according to the operation state of the safety operation member.

5. The display device according to claim 1, wherein the display control unit changes an allocation of the guidance display area on the display screen according to the operation state of the safety operation member.

6. The display device according to claim 1, wherein the display control unit changes a background of the guidance display area on the display screen according to the operation state of the safety operation member.

7. A construction machine comprising a display device, wherein the construction machine is capable of executing a plurality of operation contents, each 4operation content corresponding to an operation element in a plurality of operation elements, wherein the display device comprises:
- a display unit that displays a display screen having a guidance display area for displaying a plurality of function signs at positions corresponding to the plurality of operation elements, wherein each function sign in the plurality of function signs corresponds to an operation content in the plurality of operation contents; and
- a display control unit that controls the display unit to change a display mode of the guidance display area according to an operation state of a safety operation member of the construction machine, wherein the display control unit
  - changes an arrangement of the plurality of displayed function signs relative to the plurality of operation elements according to the operation state of the safety operation member, and
  - changes, for each of the plurality of operation elements, the corresponding operation content to correspond to the displayed function signs.

8. The construction machine according to claim 7, wherein
each function sign is indicative of the corresponding operation content.

9. The construction machine according to claim 8, wherein
the display control unit hides from display at least one of the function signs according to the operation state of the safety operation member.

10. The construction machine according to claim 8, wherein
the display unit displays an initial arrangement order of the plurality of function signs on the display screen, and
the display control unit changes the initial arrangement order of the plurality of function signs in the guidance display area according to the operation state of the safety operation member.

11. The construction machine according to claim 7, wherein
the display control unit changes an allocation of the guidance display area on the display screen according to the operation state of the safety operation member.

12. The construction machine according to claim 7, wherein
the display control unit changes a background of the guidance display area on the display screen according to the operation state of the safety operation member.

* * * * *